(12) United States Patent
Provost

(10) Patent No.: US 9,388,769 B2
(45) Date of Patent: Jul. 12, 2016

(54) ASSEMBLY FOR HOLDING THE INTERFACE OF A FRONT FRAME OF A NACELLE AND A TURBOJET ENGINE CASING

(71) Applicant: AIRCELLE, Gonfreville L'Orcher (FR)

(72) Inventor: Fabrice Provost, Notre-Dame-du-Bec (FR)

(73) Assignee: AIRCELLE, Gonfreville L'Orcher ( * ) Notice: Subject to any disclaimer, the term of this patent is extended or adjusted under 35 U.S.C. 154(b) by 0 days.

(21) Appl. No.: 14/630,837

(22) Filed: Feb. 25, 2015

(65) Prior Publication Data

US 2015/0167586 A1    Jun. 18, 2015

Related U.S. Application Data

(63) Continuation of application No. PCT/FR2013/051969, filed on Aug. 26, 2013.

(30) Foreign Application Priority Data

Aug. 27, 2012    (FR) ...................................... 12 57992

(51) Int. Cl.
*F02K 1/80* (2006.01)
*F01D 25/24* (2006.01)
*F02K 1/54* (2006.01)

(52) U.S. Cl.
CPC ................ *F02K 1/80* (2013.01); *F01D 25/243* (2013.01); *F02K 1/54* (2013.01); *F05D 2240/90* (2013.01); *F05D 2260/30* (2013.01); *F05D 2260/37* (2013.01)

(58) Field of Classification Search
CPC ........... F02K 1/80; F02K 1/54; F01D 25/243; F05D 2240/90; F05D 2260/30; F05D 2260/37
USPC .............................. 60/796–798, 226.2; 244/54
See application file for complete search history.

(56) References Cited

U.S. PATENT DOCUMENTS 3,347,578 A * 10/1967 Sheehan ................ B64D 29/06
                                                244/54
4,951,973 A *  8/1990 Corsmeier ............ F01D 25/243
                                                285/24

(Continued)

FOREIGN PATENT DOCUMENTS

EP    1 752 648 A2    2/2007
EP    2 434 193 A2    3/2012

(Continued)

OTHER PUBLICATIONS

International Search Report issued Oct. 9, 2013 in International Application No. PCT/FR2013/051969.

*Primary Examiner* — Ted Kim

(74) *Attorney, Agent, or Firm* — Burris Law, PLLC

(57) ABSTRACT

The present disclosure relates to a holding assembly to hold a front frame of a thrust reverser to a turbojet engine casing. The assembly includes at least one connecting flange connecting the front frame to the turbojet engine casing, and also a system for locking the connecting flange. The system includes an actuating handle pivotally mounted on one of two facing ends of the connecting flange, and a connecting rod interposed between the other end of the two facing ends and a portion of the actuating handle. The system locks together the two facing ends, and the actuating handle includes a support provided with a groove and a screw for adjusting a free length of the groove. Furthermore, the connecting rod has, at its one end, an axis pivoting and sliding in the groove.

15 Claims, 4 Drawing Sheets

(56) References Cited

U.S. PATENT DOCUMENTS 5,076,514 A * 12/1991 Melcher ............... B64D 29/06
        244/129.4
2011/0120143 A1 * 5/2011 Soulier ............... B64D 29/06
        60/798

FOREIGN PATENT DOCUMENTS

| | | |
|---|---|---|
| FR | 2 952 615 A1 | 5/2011 |
| GB | 594 198 A | 11/1947 |
| WO | 2012/095600 A1 | 7/2012 |

* cited by examiner

ASSEMBLY FOR HOLDING THE INTERFACE OF A FRONT FRAME OF A NACELLE AND A TURBOJET ENGINE CASING

CROSS-REFERENCE TO RELATED APPLICATIONS

This application is a continuation of International Application No. PCT/FR2013/051969, filed on Aug. 26, 2013, which claims the benefit of FR 12/57992, filed on Aug. 27, 2012. The disclosures of the above applications are incorporated herein by reference.

FIELD

The present disclosure relates to an assembly for holding the interface of a turbojet engine casing and of the structure of a thrust reverser of a nacelle, and to a propulsion assembly comprising such an assembly.

BACKGROUND

The statements in this section merely provide background information related to the present disclosure and may not constitute prior art.

An aircraft is provided in general with a propulsion assembly comprising a turbojet engine surrounded by a nacelle. The turbojet engine generally includes, upstream, fan blades actuated by an engine. The fan blades are surrounded by a casing allowing mounting said turbojet engine in the nacelle.

The fan of the turbojet engine is composed essentially of a rotating shaft carrying a plurality of vanes. At their radial end, the vanes are surrounded circumferentially by a casing. The fan casings are generally machined metallic elements.

The turbojet engine can be a bypass turbojet engine capable of generating a hot air flow (also called primary flow) coming from the combustion chamber of the turbojet engine, and a cold air flow (secondary flow) coming from the fan and which circulates outside the turbojet engine through an annular channel, also called "flow path", formed between a fairing of the turbojet engine and an inner wall of the nacelle. At the rear of the nacelle, both the primary and secondary flows mix together.

This nacelle is generally equipped with a thrust reverser.

During landing of an aircraft, the thrust reverser allows improving the braking ability of the aircraft by redirecting forward at least a part of the thrust generated by the turbojet engine. In this phase, the thrust reverser obstructs the gas ejection nozzle and directs the ejection flow of the engine to the front of the nacelle, thereby generating a counter-thrust which adds to the braking of the wheels of the aircraft.

More specifically, a nacelle generally exhibits a structure comprising an air inlet upstream of the engine, a median structure intended to surround the casing of the turbojet engine, and a downstream structure comprising an Inner Fixed Structure ("IFS") and an Outer Fixed Structure ("OFS") intended to surround the combustion chamber of the turbojet engine and accommodating the thrust reversal means.

The thrust reversal means are diverse and can be in the form of at least a movable cowl, called "thrust reverser cowls", moving in translation thanks to actuators along a direction substantially parallel to a longitudinal axis of the nacelle.

During this phase of flight, the structure of the thrust reverser is subjected to axial aerodynamic forces which tend to push back longitudinally the thrust reversal means relative to the turbojet engine.

In order to support the movable thrust reverser cowls and connect the downstream section to the median section via the fan casing, the downstream section comprises fixed elements and, in particular, longitudinal beams connected upstream to an outer fixed structure comprising a substantially annular assembly called front frame, formed in one or more portion(s) between said longitudinal beams, and intended to be fixed to the periphery of the downstream edge of the fan casing of the engine.

The structure of the thrust reverser is generally made of two half portions articulated into an upper portion on the pylon, called "D-duct" or "C-duct" structure.

In this configuration, the holding between the fan casing and the front frame is achieved by a male portion, generally carried by the front frame, cooperating in a female portion, generally carried by the casing.

More particularly, the front frame is connected to the fan casing by fixation means generally of the knife-edge/throat type comprising a substantially annular flange, made from one or several portion(s), secured to the front frame and cooperating with a J-shaped or V-shaped groove, commonly referred to as J-ring.

Such a holding assembly is not adapted for nacelles in which the rear portion is capable of sliding during maintenance operations (nacelle called or O-duct) towards the rear of the nacelle along a substantially longitudinal direction of the latter.

Indeed, in such a configuration of the nacelle, it would be appropriate to anticipate one or several segment(s) of the downstream section opening laterally so as to be able to space apart the flange from the throats and free the front frame from the casing.

Several systems of connection between the downstream section and the fan casing compatible with a nacelle of the O-duct type, thenceforth, have been developed.

There is known in particular the setting up of an assembly for holding the interface of the outer fixed structure of a nacelle of the turbojet engine casing, comprising:
 a first protruding element belonging to the upstream end of the outer fixed structure;
 a second protruding element belonging to the downstream end of the casing;
 said at least first and second protruding elements being configured for coming into contact with one another;
 two half-rings formed by a wall defining a housing, configured to receive the first and second protruding elements when the casing and the outer fixed structure are mounted edge-to-edge, and abutting means configured to hold the first and second protruding elements in the housing.

This holding assembly thus allows connecting, by a connecting flange formed of two half-rings, the downstream end of the casing and the upstream end of the outer fixed structure of the downstream structure accommodating the thrust reversal means.

In a conventional manner, the two half-rings can be fixed together by fixation means, which provides the tightening and holding force of the protruding elements.

In a known manner, the fixation means can include locking elements such as a three-point hook lock, one of the half-rings supporting the portion of the lock that includes the hook and the other half-ring supporting the portion that comprises the retaining member of said hook.

Moreover, locking elements comprise an actuating handle pivotally mounted on one of the ends of the connecting flange and a connecting rod interposed between the other end of the flange and a portion of the handle separate from the axis of rotation of this handle.

Such a device allows pre-stressing the connecting flange when it is in the closed position.

However, with the known locking elements, the opening of the half-rings of the connecting flange depends on the circumference dimensions specific of the nacelles on which the locking element and the flange are installed.

Thus, the locking elements must be adapted specifically to nacelles with particular circumference dimensions.

This multiplies the references of parts and the production costs, in order to be adapted to each one of the manufactured nacelles.

A posed problem is, thereafter, to provide a fixed position of the connecting flange when it is in the open position, for a same stroke of the handle regardless of the variations of the circumference dimensions of the concerned nacelle.

SUMMARY

The present disclosure provides an assembly for holding a front frame of thrust reverser to a turbojet engine casing, comprising:
   at least one connecting flange intended to engage the front frame and the turbojet engine casing so as to connect them, and
   a system for locking the connecting flange allowing to lock together two facing ends of the connecting flange, this system comprising an actuating handle pivotally mounted on one of the ends of the flange and a connecting rod interposed between the other end of the flange and a portion of the handle separate from the axis of rotation of this handle.

The holding assembly is remarkable in that:
   the handle comprises a support provided with a groove and a screw for adjusting the free length of this groove,
   at one of its ends, the connecting rod comprises an axis able to pivot and slide in the groove so that:
   the axis of the connecting rod is abutted to one end of the groove, in an open position of the connecting flange or in a closed position of the connecting flange and,
   the axis of the connecting rod abuts against the set screw situated at the other end of the groove, respectively in a closed position of the connecting flange or in an open position of the connecting flange.

Thanks to the present disclosure, we obtain a stroke of closing of the connecting flange that is variable with the circumference dimensions of the nacelle on which it is set up whereas the stroke of the handle is invariable.

Indeed, the set screw allows obtaining a stroke that is variable between the two ends of the connecting flange at the closing, depending on the nacelles on which this flange must be adapted.

The holding assembly of the present disclosure allows, in addition, locking and unlocking the interface of the casing and of the front frame for nacelles of different circumference dimensions, in a simple and rapid manner.

The maintenance time as well as the costs are reduced and controlled.

According to other characteristics of the present disclosure, the holding assembly of the present disclosure includes one or several of the following characteristics considered alone or according to all possible combinations:
   the handle comprises an arm slidably mounted on the support and comprising a blocking element so that:
   in an open position of the connecting flange, the arm is in a retracted position on its support, thanks to which this blocking element blocks the axis of the connecting rod at an end of the groove;

Thanks to the present disclosure, we obtain the same clearance at the opening between the two ends of the connecting flange for a same stroke of the handle regardless of the variations of the circumference dimensions of the corresponding nacelles.

Indeed, the blocking of the axis of the connecting rod by the element for blocking the handle arm in an open position allows having a fixed clearance between the two ends of the connecting flange in an open position.

According to other characteristics of the present disclosure, the holding assembly of the present disclosure includes one or several of the following characteristics considered alone or according to all possible combinations:
   the blocking element comprises a blocking finger formed at an end of the arm;
   the blocking element comprises an adjustable wedge formed at an end of the arm;
   the support of the handle is pivotally mounted around a longitudinal axis relative to the end of the flange on which it is fixed;
   the connecting rod is mounted on the other end of the flange by a ball-joint or pivot connection;
   the set screw is adapted for defining a dead stroke of the handle;
   the set screw is slidably mounted on the handle support, by cooperating with a nut mounted on the handle support;
   the connecting rod is of adjustable length, in order to allow adjusting the clearance between the two ends of the connecting flange in an open position;
   the handle is movably and pivotally mounted on one of the ends of the flange between at least one locked open position and one locked closed position;
   the arm of the handle comprises a blocking bolt capable of cooperating with two strikers secured to one of the ends of the flange, and allowing to lock the handle in its respective open and closed positions;
   the blocking bolt cooperates with the two strikers secured to one of the ends of the flange in a retracted position of the arm on the handle support.

The present disclosure further relates to a propulsion assembly of an aircraft comprising a turbojet engine housed in a nacelle, the turbojet engine comprising fan blades surrounded by a casing mounted edge-to-edge with a front frame of the downstream structure of the nacelle, said propulsion assembly including a holding assembly as aforementioned.

Advantageously, the length of the handle is such that it exceeds the volume of the nacelle when it is in an open position, thus reducing the risk of closing the nacelle without having correctly closed the flange, during maintenance operations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
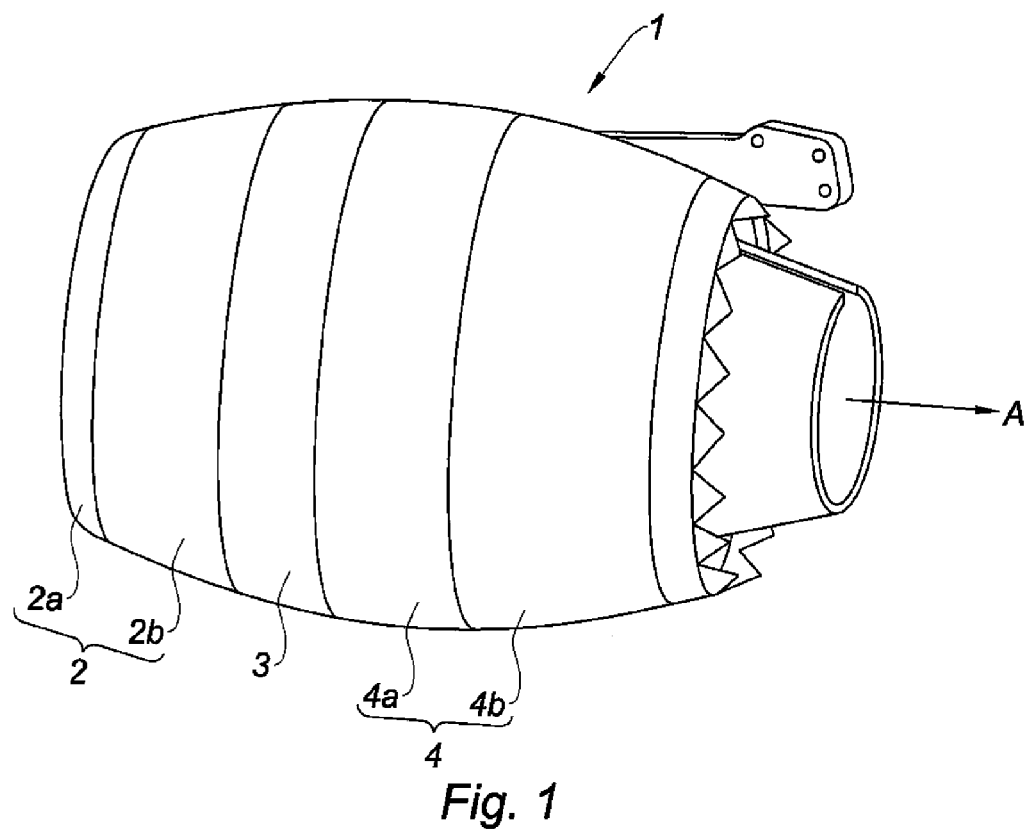
FIG. 1 is a longitudinal sectional view of a propulsion assembly of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a schematic representation of a nacelle 1 of a turbojet engine which exhibits an axis of revolution or a main longitudinal axis A.

The nacelle 1 constitutes a substantially tubular housing for a turbojet engine and generally comprises an upstream section 2 of air inlet, a median section 3 surrounding a turbojet engine fan and a downstream section 4 surrounding a combustion chamber of the turbojet engine.

The upstream section 2 conventionally comprises a lip structure of air inlet 2a extended by a downstream structure of air inlet 2b.

Figure 2:
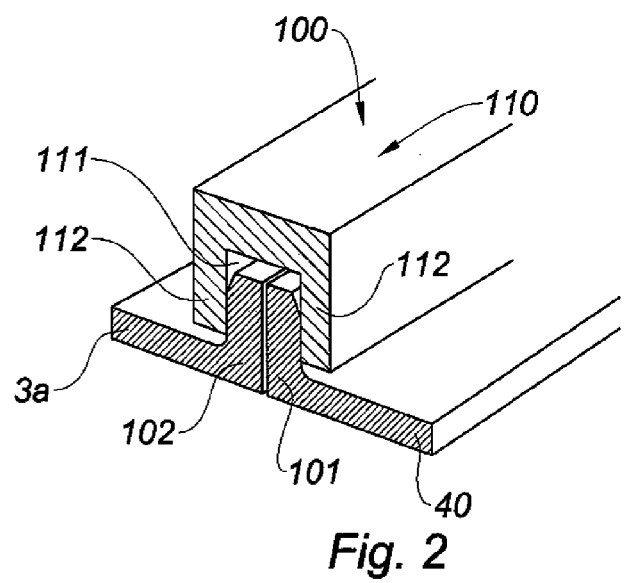
FIG. 2 is a perspective view of one form of a holding assembly between a turbojet engine casing and a front frame of a rear section of the nacelle of FIG. 1, the holding assembly being in an engaged position.

The median section 3 surrounds the turbojet engine fan and exhibits an inner wall formed of a fan casing 3a (illustrated in FIG. 2).

The downstream section 4 can accommodate a thrust reverser device 4b disposed in the extension of an upstream section for fastening 4a to the rest of the nacelle, and in particular to the median section 3.

In one form, it is desired to fix in a strong manner the downstream section 4 to the median section 3.

More particularly, according to the configuration of the nacelle, the downstream section 4 and the median section 3 are fastened in a detachable manner to permit an opening by longitudinal translation of the downstream section 4.

With reference to FIGS. 1 and 2, the fastening of the downstream section 4 to the median section 3 is performed via a front frame 40 of the downstream section 4 (and providing in particular the support of the thrust reverser device 4b where appropriate) exhibiting a substantially annular shape.

More particularly, the upstream end of the front frame 40 is configured to be connected to the downstream end of the fan casing 3a.

In this case, the casing 3a and the front frame 40 are said to be "mounted edge-to-edge".

The fastening of the font frame 40 to the fan casing 3a is provided by a holding assembly 100 which allows to hold and to lock the front frame 40 and the fan casing 3a.

With reference to FIG. 2, this holding assembly 100 comprises:

a first protruding element 101 belonging to the upstream end of the front frame 40 (conventionally called "J-ring" due to its substantially J-shape exhibiting an end return with which a connecting flange 110 can engage), a second protruding element 102 belonging to the downstream end of the casing 3a (also called "J-ring" for the same reasons), said first 101 and second 102 protruding elements being configured to come into contact with one another, at least one connecting flange 110 defining a housing 111, configured to receive the first 101 and second 102 protruding elements when the casing 3a and the front frame 40 are mounted edge-to-edge, and abutting means 112 configured to hold the first 101 and second 102 elements in the housing 111.

Figure 3:
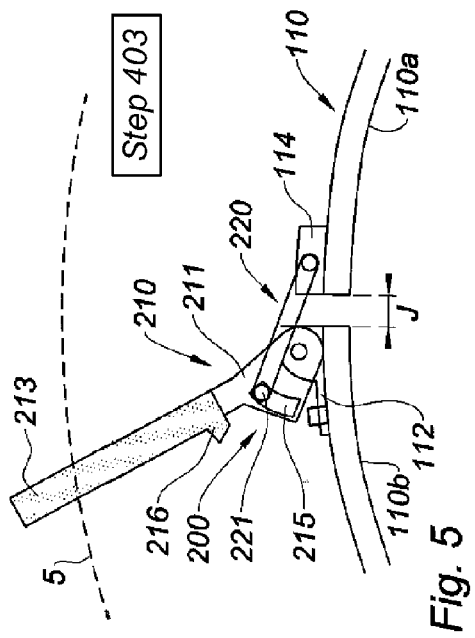
FIGS. 3 to 6 are sectional views of a locking device of the holding assembly of FIG. 2, during the different successive steps of closing a connecting flange of said holding assembly.

As illustrated particularly in FIG. 3, the connecting flange 110 is made from at least two flange sectors 110a, 110b movably and pivotally mounted between: an engaged position in which the flange 110 engages with the annular protruding element 102 of the fan casing 3a and the annular protruding element 101 of the front frame 40 so as to connect them, and an open position in which the flange 110 is radially spaced apart from the annular protruding element 102 of the fan casing 3a and the annular protruding element 101 of the front frame 40 so as to allow a longitudinal spacing of the fan casing 3a and of the front frame 40.

According to the shown example, the flange 110 comprises two flange sectors 110a, 110b substantially hemispherical capable of opening outwards, by pivoting them around a substantially longitudinal axis P situated at the lower end (not illustrated) of said concerned flange sector 110a, 110b.

In a complementary manner, the flange sectors 110a, 110b are, advantageously, fixed together, by locking means 200 allowing to provide the tightening and holding force of the protruding elements 101, 102.

These locking means 200 can carry out a locking facilitating an accurate control of the kinematics for the opening and closing of the connecting flange 110.

Figure 6:
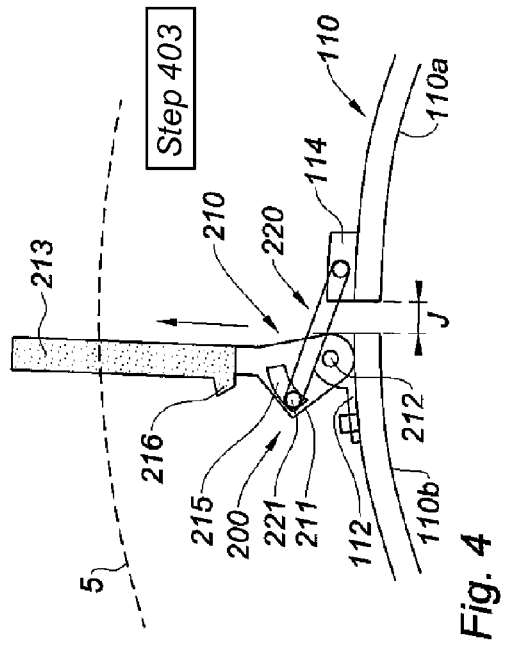
Figure 9:
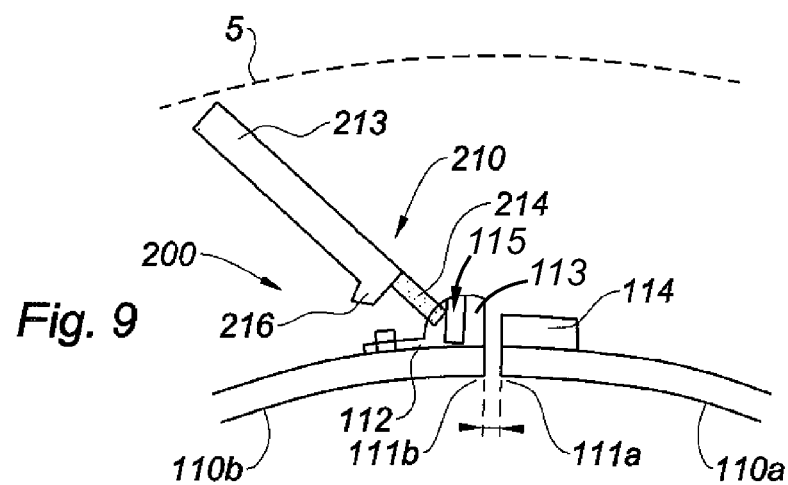

In a locked position, the two flange sectors 110a, 110b can be joined advantageously in a 12 o'clock position relative to the nacelle from the front view, as illustrated in FIGS. 6 and 9.

In this case, the locking means 200 of said flange sectors 110a, 110b are located in this 12 o'clock position.

These locking means 200 are of the three-point type comprising, firstly, a control lever provided with an actuating handle 210 pivotally mounted on one of the free ends 111b of the first sector 110b of the connecting flange 110 and a connecting rod 220 interposed between one of the free ends 111a of the second sector 110a of connecting flange and the handle 210.

According to the configuration shown in FIGS. 3 to 9, the left sector flange 110b on the figure supports the handle portion 210 and the right flange sector 110a supports the portion comprising the connecting rod 220.

Figure 7:
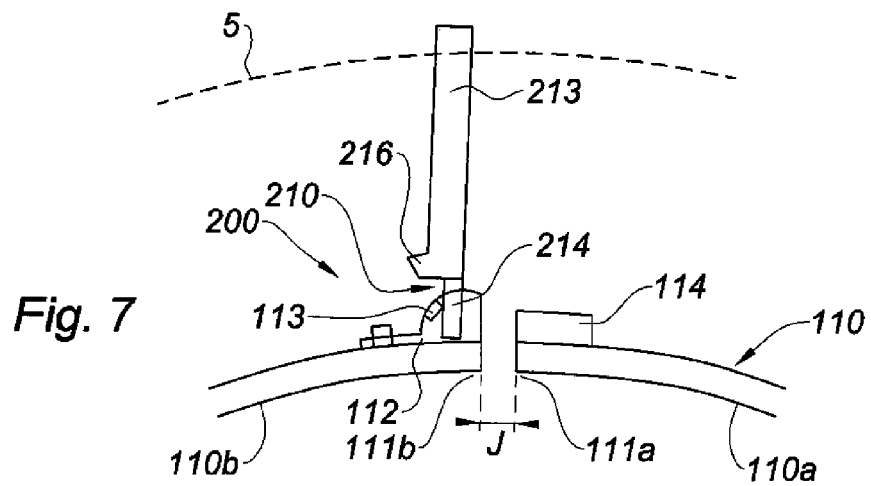
FIGS. 7 to 9 are views of FIGS. 3, 4 to 6 in which a portion of the locking device of the holding assembly of FIG. 2 has been removed.
Figure 8:
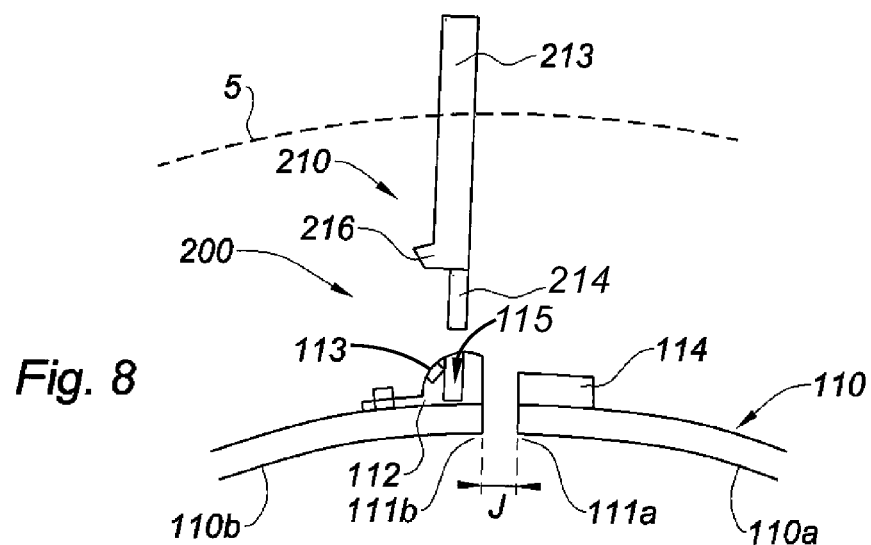

This actuating handle 210 is movably and rotatably mounted between several positions: an unlocked open position corresponding to the position of opening of the two sectors 110a, 110b of the connecting flange 110 illustrated in FIG. 8; an unlocked closed position corresponding to the position of closing of both flange sectors 110a, 110b; and two locked positions in an open position and a closed position, respectively illustrated in FIGS. 7 and 9.

The locked open position of the actuating handle 210 allows preventing buttressing of the connecting flange 110 during rotation insofar as the handle is stable in this determined position.

More particularly, the actuating handle 210 comprises a support 211 pivotally mounted by a longitudinal axis 212 on a bracket 112 mounted at the free end 111b of the left sector 110b of the connecting flange 110 and an arm 213 slidably mounted along the support.

According to a variant represented in FIGS. 3 to 9, the bracket 112 is disposed on the "upper" surface of the corresponding flange sector 110b, namely the farthest one from the interface of the fan casing 3a and of the front frame 40.

As illustrated in FIGS. 7 to 9, the arm 213 is provided at its end facing the support 211 with a blocking bolt 214 adapted for cooperating with several locking strikers 113 distributed over the outer surface of the bracket 112 secured to the flange sector 110b, allowing to hold the handle 210 in its respective open and closed positions.

These strikers 113 each include a notch 115 in which the bolt 214 is housed depending on the degree of opening of the handle 210.

As illustrated more particularly in FIG. 8, two strikers 113 are provided on the bracket 112 and arranged to the right of the locked open and locked closed positions of the handle 210.

The distance between the two strikers 113 defines the permitted angular stroke for the handle 210 between its different open and closed positions.

Depending on the sliding of the arm 213 on the support 211, the bolt 214 can or cannot cooperate with the striker 113 corresponding to the desired degree of opening of the handle 210.

Thus, the arm 213 exhibits a retracted position on the support 211 in which the bolt 214 engages in a corresponding striker 113 and a deployed position in which the bolt 214 is disengaged and free from the corresponding striker 113.

The cooperation between the blocking bolt 214 and strikers 113 allows providing the handle 210 during its opening or closing to have two secured positions, namely a locked open position by the blocking of the bolt 214 in the corresponding striker 113 and a locked fixed position closed by the same cooperation of the bolt and a striker.

This provides the handle 210 an invariable handle 210 stroke despite the variable stroke upon the closing carried out by the two sectors 110a, 110b of the connecting flange, as will be seen below.

Secondly, the locking means 200 comprise the connecting rod 220, of adjustable length, interposed between the second right sector 110a of the flange 110 and a portion of the handle 210 separate from the axis of rotation 212 of this handle 210.

Advantageously, the adjustable connecting rod 220 allows adjusting the clearance between the two ends of the connecting flange in an open position.

This connecting rod 220 is provided with a first end articulated on a bracket 114 secured to the second right sector 110a of the connecting flange 110.

This connecting rod 220 is mounted in ball-joint or simple pivot connection, according to the type of nacelle and the location of the connection in concern, on a fixation point of the bracket 114.

At its opposite free end, the connecting rod 220 comprises a male portion 221 capable of cooperating with a retaining member 215 situated on the support 211 of the handle 210 and defining a female portion.

The female portion is defined by a transverse guide hole 215 formed of a curvilinear groove 215 on the handle support.

The male portion is defined by an axis 221 formed of a pin capable of pivoting and sliding in the groove 215.

The pin 221 is slidably mounted in the groove 215 of the handle and articulated on an axis different from the pivot axis of the handle.

The cooperation of the pin 221 and the groove 215 allows securing together the two sectors 110a, 110b of the connecting flange 110.

The connection between the groove 215 for guiding the handle 210 and the pin 221 of the connecting rod 220 permits an angular displacement of the handle 210 relative to the connecting rod 220.

This displacement 220 corresponds to the clearance defined in the two senses of the direction of the handle 210 by the length between the two ends of the groove 215.

Thus, a limited movement of the handle 210 is permitted relative to the connecting rod: we talk, thereafter, about dead stroke of the handle 210.

Once this clearance is consumed, any additional angular movement of the handle towards one of its positions causes a movement of the connecting rod 220 which exerts compression or traction forces on the two sectors 110a, 100b and, where appropriate, their approximation or separation.

Figure 10:
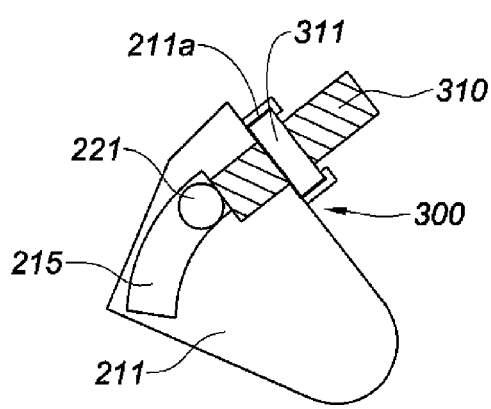
FIGS. 10 and 11 are two sectional views of a first form of a system for adjusting the effective stroke of a connecting flange of the holding assembly of FIG. 2 illustrating two separate effective strokes, the connecting flange being in a closed position.
Figure 11:
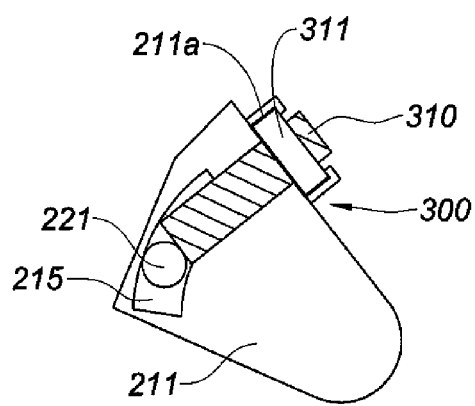
Figure 12:
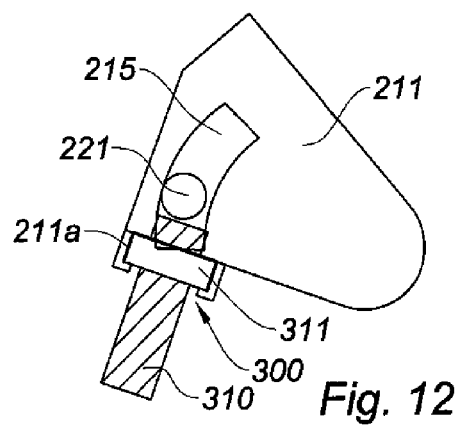
FIGS. 12 and 13 are sectional views of a variant of the system for adjusting the effective stroke of FIGS. 10 and 11 illustrating two separate effective strokes, the connecting flange being in an open position.
Figure 13:
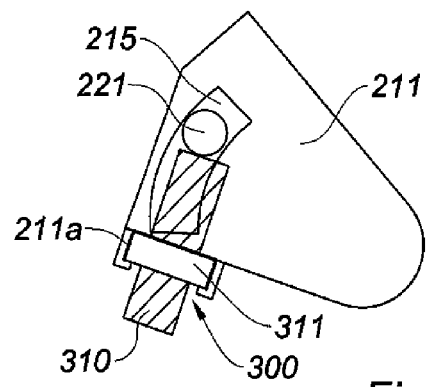

Advantageously, the holding assembly 100 comprises a system 300 for adjusting the effective stroke of the two sectors 110a, 110b of the flange 110 during their closing/opening, as illustrated, in a first form, in FIGS. 10 and 11 and, in a second form, in FIGS. 12 and 13.

This adjusting system 300 comprises an set screw 310 slidably mounted on the support 211 of the handle 210 and adapted for cooperating with the curvilinear groove 215 of this support 211.

This screw 310 cooperates with a nut 311 housed in a housing 211a arranged on the support 211 and stationary in translation in this housing 211a.

More particularly, by adjusting the position of the screw 310 on the support 211, the free length of the groove 215 is adjusted by acting as an abutment, at either end of the groove 215, upon movement of the pin 221 in the groove 215.

In a first form illustrated in FIGS. 10 and 11, the nut 310 and the corresponding screw are mounted at one of the ends of the groove 215 whereas, in the second form illustrated in FIGS. 12 and 13, the nut 310 and the corresponding screw are mounted at the opposite end of the groove 215.

Whatever the form, by adjusting the free length of the groove 215, the dead stroke of the handle 210 and the displacement of the handle 320, permitted with respect to the connecting rod 220, are adjusted and defined.

With reference to FIGS. 10 and 12, the maximal dead stroke which can be permitted for the handle 210 is observed.

This maximal dead stroke corresponds to the length between the two opposite ends of the groove 215.

In this case, the screw 310 is in a position called retracted position on the support 211 that is to say that its free end intended to cooperate with the pin 221 is placed to the right of the end of the guide groove 215 which is closest to the nut 311.

With reference to FIGS. 11 and 13, the minimal dead stroke which can be permitted for the handle 210 is observed.

This minimal dead stroke corresponds to a deployment of the set screw 310 on the support 211 so that the free length of the groove 215 is reduced to the maximum.

This stroke corresponds to the blocking, thereafter, of the pin 221 against the end of the groove 215 which is the farthest from the nut 311.

Advantageously, the system 300 for adjusting the dead stroke of the handle 210 allows determining the effective stroke of the two sectors 110a, 110b of the flange 110 during their opening or closing.

The maximal dead stroke of the handle is adapted for allowing a minimal stroke between the flange sectors 110a, 110b.

The minimal dead stroke, in turn, is adapted for allowing a maximal stroke between the flange sectors 110a, 110b.

Thanks to the present disclosure, we obtain a stroke of closing the connecting flange 210 which is variable depending on the circumference dimensions of a nacelle whereas the stroke of the handle 210 is invariable.

Thus, the present disclosure provides an opening with a constant clearance during the opening of the two flange sectors 110a, 110b outwards while proposing a variable stroke of the two flange sectors 110a, 110b.

Advantageously, the system 300 for adjusting the dead stroke of the handle 210 allows the adjustment of the preload of the two flange sectors 110a, 110b, the definition of this preload allowing to act on the clearance J between the two ends of the two flange sectors during closing and locking of the connecting flange 110.

In addition, the system 300 for adjusting the dead stroke of the handle 210 also allows this clearance J to be variable between the two ends of the two flange sectors during closing and locking of the connecting flange.

The adjustment of the preload by the second form of the system 300 for adjusting the dead stroke can be improved by the presence of the connecting rod 220.

This clearance J is a transverse clearance, namely along an axis perpendicular to the longitudinal axis A of the nacelle, after tightening the two sectors 110a, 110b of flange 110.

This clearance J allows taking into account the manufacturing tolerances of the protruding elements 101, 102 of the front frame 40 and of the fan casing 3a to hold and to guarantee the force for holding together the two sectors of flange 110.

This adjustable clearance thus adapts to the different nacelle configurations in which the locking means 200 can be installed.

Moreover, with reference to FIGS. 3 to 9 and to the first form of the system for adjusting the effective stroke illustrated in FIGS. 10 and 11, the arm 213 of the handle 210 comprises, at its end where the bolt 214 is arranged, a blocking finger 216 adapted for blocking the axis 221 of the connecting rod 220 at an end of the guide groove 215 which is the farthest from the fixation of the set screw 310 on the support 211, when the arm 213 is in a retracted position on the support 211 and the handle 210 in a locked open position.

The blocking of the axis 221 of the connecting rod 220 by the finger 216 of the handle 210 in an open position allows having a fixed clearance between the two sectors 110a, 110b of the connecting flange 110 at the opening for a same stroke of the handle, independent of the variations of the circumference dimensions of the corresponding nacelles.

Advantageously, a locked open position is provided for the two sectors 110a, 110b of the connecting flange 110 by blocking the axis 221 of the connecting rod 220 by the action of the blocking finger 216 of the arm 213, without blocking the axis 221 in rotation during the entire kinematics of closing.

In a non-limiting example form, the blocking finger 216 is shaped as a portion of the bent end of the arm 213, of which active face, in contact with the axis 221 of the connecting rod 220, is beveled.

Figure 14:
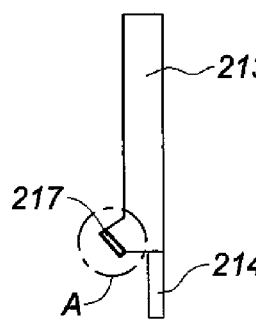
FIG. 14 is a sectional view of a variant of an actuating handle of a locking device of the holding assembly of FIG. 2.
Figure 15A:
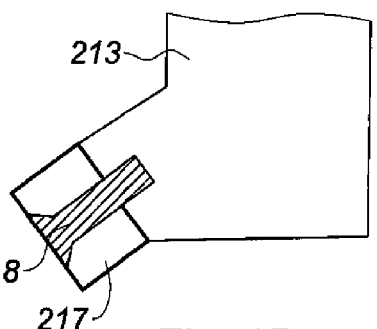
FIGS. 15a and 15b are two enlarged views of Zone A of FIG. 14.
Figure 15B:
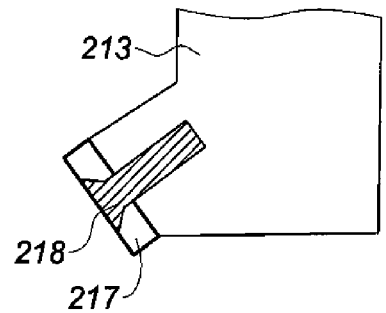

In a variant illustrated in FIGS. 14, 15a and 15b, the blocking finger 216 is replaced by an adjustable blocking wedge 217, slidably mounted on a bent end portion of the arm 213.

This blocking wedge 217 cooperates with a screw 218, the screwing of which will determine the degree of sliding outside the bent end portion of the arm 213 of the blocking wedge 217 and therefore the thickness of the wedge 217, depending on the adjustment of the effective stroke of the two sectors 110a, 110b of flange 110 during their closing/opening.

This blocking wedge 217 is particularly used in the second form of the system for adjusting the effective stroke of the two sectors 110a, 110b of flange 110 during their closing/opening.

Moreover, the length of the arm 213 of the handle 210 is such that it exceeds the volume of the nacelle when the handle 210 is in a locked open position and, more particularly, the outer cowl 5 of the nacelle, as illustrated in FIG. 3.

We thus eliminate the risk of closing the nacelle without having correctly closed the connecting flange 110, during maintenance operations.

The mode of operation of the holding assembly that has just been described during the closing and locking of the connecting flange 110 on the protruding elements of the fan casing 3a and of the front frame 40 exhibits, in particular, the successive steps illustrated in FIGS. 3 to 9.

In a first step 401, with reference to FIG. 3, the locking means 200 are open.

The two sectors 110a, 110b of flange 110 are open outwards, in an open position of the connecting flange 110.

A constant clearance J, whatever the circumference dimensions of the nacelles, is defined between the two ends 111a, 111b of the two flange sectors 11a, 110b.

In a non-limitative example, the clearance J can be in the range of 20 mm.

The two flange sectors 110a, 110b are locked in their open position thanks to the blocking of the axis 221 of the connecting rod 220 against an end of the groove 215 by the finger 216 for blocking the arm 213, in a retracted position on its support 211.

In this retracted position of the arm 213, the handle 210 is in an open and locked position in this open position.

Indeed, the bolt 214 for locking the arm 213 is engaged in the striker 113 corresponding to the open position of the handle 210, as illustrated in FIG. 7.

This step can be identified by the protrusion of the arm 213 of the handle 210 outside the aerodynamic lines of the outer cowl 5, as illustrated in FIG. 3.

Figure 4:
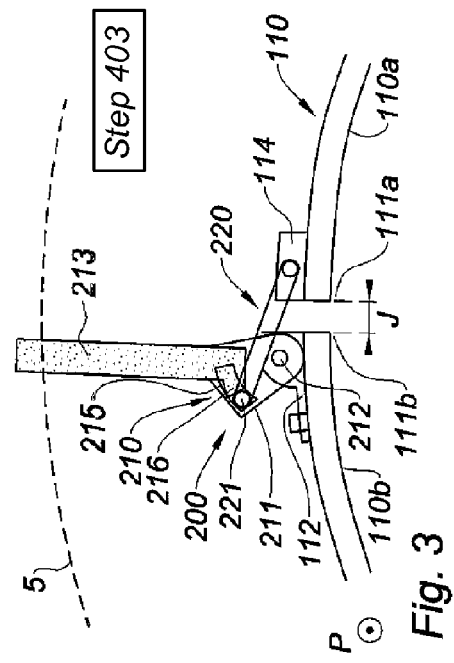

In an subsequent step 402 illustrated in FIGS. 4 and 8, the arm 213 is slid towards the outside of the support 211, which causes the disengagement of the bolt 214 of the arm 213 from the striker 113 of the bracket 114 secured to the sector 110a of the flange 110.

This disengagement allows freeing the rotation of the handle 210.

The handle 210 is, thereafter, in an unlocked open position.

The blocking finger 216 for the arm 213 has, moreover, freed the pin 221 of the connecting rod 220.

Thereafter, the pivoting of the handle 210 around its pivot axis 212 can be initiated, in the direction of its closing position.

With reference to the form of FIGS. 10 and 11, the angular displacement of the handle 210 causes a sliding of the pin 221 of the connecting rod 220 in the guide groove 215, towards the opposite end of the groove 215 in the direction of the set screw 310.

Figure 5:
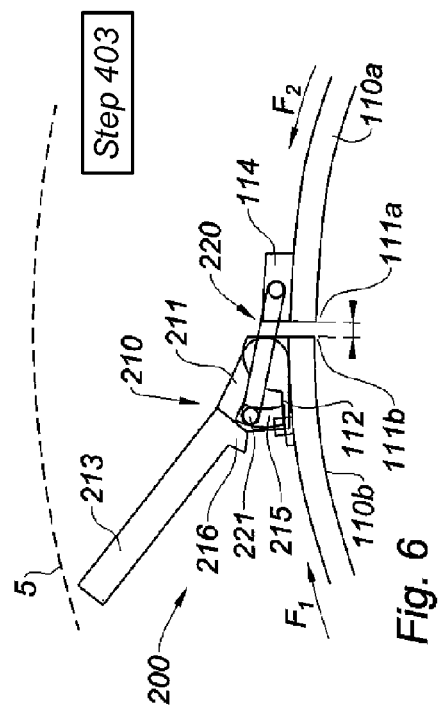

In FIG. 5, the handle 210 is in an intermediate position between its open and closed positions, at the end of its dead stroke.

In this step 403, the axis 221 of the connecting rod 220 is at the opposite end of the groove 215, abutting against the free end of the set screw 310.

The two sectors 110a, 110b of the connecting flange 110 are not yet closed and approximated. The clearance J between the two sectors has not yet been modified.

As described before, the effective stroke of the two flange sectors 110a, 110b and the dead stroke of the handle have been determined, beforehand, by the adjustment of a predetermined sliding of the set screw 310 on the support 211, in order to adjust the free length of the guide groove 215.

In this subsequent step, the rotational motion of the handle 210 is continued.

The axis 221 of the connecting rod 220 abutting against the groove 215, the rotation of the handle 210 causes a movement of the two flange sectors allowing closing of the connecting flange 110, in a direction indicated by the arrows F1, F2 in FIG. 6.

In a subsequent step 404 illustrated in FIGS. 6 and 9, the handle has continued its angular movement towards its closing position and has reached its closing position.

In parallel, the two flange sectors 110a, 110b have continued their effective stroke determined by the adjustment of the free length of the groove by the stroke adjusting system 300.

By completely pulling back the handle 210 against the outer surface of a flange sector on which it is mounted, the blocking bolt 214 engages with a striker 113 corresponding to the closing position of the handle, as illustrated in FIG. 9.

The handle 210 is, consequently, in a locked closed position.

It is the same with flange sectors 110a, 110b in a locked and closed position.

At this stage, the axis 221 of the connecting rod is held in abutment against the free end of the set screw 310 of the stroke adjusting system 300.

The mode of operation of the holding assembly during the closing and locking of the connecting flange 110 on the protruding elements of the fan casing 3a and of the front frame 40 remains valid for the second form of the dead stroke adjusting system illustrated in FIGS. 12 and 13 associated with the blocking wedge to the following differences.

In the form of FIGS. 12 and 13, in the open position of the flange 110, the axis 221 of the connecting rod 220 is abutting against the set screw 310.

During the closing, it slides, thereafter, from the end of the groove 215 adjacent to the set screw 310 towards the opposite end of the groove 215 while moving away from the set screw 310.

This second form offers the advantage, with respect to the first form, of better controlling the closing force of the connecting flange 110 insofar as once we are in a closed position, the axis 221 of the connecting rod 220 remains invariable.

Of course, the present disclosure is in no way limited to the forms described above, and other variants of the holding assembly might be considered.

What is claimed is:

1. A holding assembly for holding a front frame of a thrust reverser to a turbojet engine casing, comprising:
    at least one connecting flange connecting the front frame to the turbojet engine casing; and
    a system for locking said at least one connecting flange, the system locking together two facing ends of said at least one connecting flange, the system comprising:
        an actuating handle pivotally mounted on one of the two facing ends of said at least one connecting flange; and
        a connecting rod interposed between the other end of the two facing ends and a portion of the actuating handle separate from an axis of rotation of the actuating handle,
    wherein the actuating handle comprises a support having a groove and a screw for adjusting a free length of the groove, and the connecting rod comprising, at one end thereof, a pin adapted to pivot and slide in the groove so that the pin abuts an end of the groove, in an open position or a closed position of said at least one connecting flange, and the pin of the connecting rod abuts a screw situated another end of the groove, respectively, in the closed position or the open position of said at least one connecting flange.

2. The holding assembly according to claim 1, wherein the actuating handle further comprises an arm slidably mounted on the support and comprising a blocking element so that, in the open position of said at least one connecting flange, the arm is in a retracted position on the support, whereby the blocking element of the arm blocks the pin at one of the ends of the groove.

3. The holding assembly according to claim 2, wherein the blocking element comprises a blocking finger formed at an end of the arm.

4. The holding assembly according to claim 2, wherein the blocking element comprises an adjustable wedge formed at an end of the arm.

5. The holding assembly according to claim 2, wherein the actuating handle is pivotally mounted on one of the two facing ends of said at least one connecting flange between a locked open position and a locked closed position.

6. The holding assembly according to claim 5, wherein the arm of the actuating handle comprises a blocking bolt capable of cooperating with at least two strikers secured to one of the two facing ends of said at least one connecting flange, and the blocking bolt configured to lock the actuating handle in the corresponding closed and open positions.

7. The holding assembly according to claim 6, wherein said at least two strikers are distributed over an outer surface of a bracket secured to one of said at least one connecting flange.

8. The holding assembly according to claim 6, wherein the blocking bolt cooperates with the two strikers secured to one of the two facing ends of said at least one connecting flange in a retracted position of the actuating handle.

9. The holding assembly according to claim 1, wherein the support of the actuating handle is pivotally mounted around a longitudinal axis of a bracket mounted at a free end of the at least one connecting flange.

10. The holding assembly according to claim 1, wherein the connecting rod is mounted on the another end of the two facing ends of said at least one connecting flange by a ball-joint or pivot connection.

11. The holding assembly according to claim 1, wherein the screw is adapted for defining a dead stroke of the actuating handle.

12. The holding assembly according to claim 11, wherein the screw is slidably mounted on the support, while cooperating with a nut mounted on the support of the actuating handle.

13. The holding assembly according to claim 1, wherein the connecting rod is of a different length to adjust a clearance between the the two facing ends of the connecting flange.

14. A propulsion assembly comprising a turbojet engine housed in a nacelle capable of being connected to an aircraft by an attachment mast, the turbojet engine comprising fan blades surrounded by a casing mounted edge-to-edge with a front frame of a downstream structure of the nacelle, said propulsion assembly including the holding assembly according to claim 1.

15. The propulsion assembly according to claim 14, wherein a length of the actuating handle goes beyond a volume of the nacelle when the actuating handle is in the open position.

\* \* \* \* \*